United States Patent
Nakahara et al.

(10) Patent No.: US 8,385,170 B2
(45) Date of Patent: Feb. 26, 2013

(54) OPTICAL DISC DISCRIMINATION METHOD, OPTICAL DISC TRANSPORT DEVICE, OPTICAL DISC DEVICE, OPTICAL DISC INSPECTION DEVICE, AND OPTICAL PICKUP INSPECTION DEVICE

(75) Inventors: Hironori Nakahara, Tokyo (JP); Yoshihiro Kiyose, Tokyo (JP); Toshiya Matozaki, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/142,403

(22) PCT Filed: Feb. 4, 2010

(86) PCT No.: PCT/JP2010/000678
§ 371 (c)(1),
(2), (4) Date: Jun. 27, 2011

(87) PCT Pub. No.: WO2010/100826
PCT Pub. Date: Sep. 10, 2010

(65) Prior Publication Data
US 2011/0271291 A1    Nov. 3, 2011

(30) Foreign Application Priority Data

Mar. 3, 2009 (JP) .................................. 2009-048961
Nov. 11, 2009 (JP) .................................. 2009-258247

(51) Int. Cl.
*G11B 5/58* (2006.01)
*G11B 15/04* (2006.01)
*G11B 19/04* (2006.01)
*G11B 7/135* (2012.01)

(52) U.S. Cl. ................................. 369/53.22; 369/112.23
(58) Field of Classification Search .................... None
See application file for complete search history.

(56) References Cited

U.S. PATENT DOCUMENTS 5,742,575 A    4/1998    Yamakawa et al.
2010/0085854 A1    4/2010    Nakahara

FOREIGN PATENT DOCUMENTS

| JP | 6-119638 A | 4/1994 |
| JP | 9-120625 A | 5/1997 |
| JP | 10-143914 A | 5/1998 |
| JP | 10-154348 A | 6/1998 |
| JP | 10-154370 A | 6/1998 |
| JP | 2004-79012 A | 3/2004 |
| WO | WO 2008/117671 A1 | 10/2008 |

*Primary Examiner* — Joseph Haley
*Assistant Examiner* — Nicholas Lee
(74) *Attorney, Agent, or Firm* — Birch, Stewart, Kolasch & Birch, LLP

(57) ABSTRACT

An optical disc device compatible with optical discs of different types having different track pitches, having a light detecting means (104) disposed in the path of diffracted light from the recording tracks on the optical disc (101), on which a light beam from a light emitting section (103) is incident. During the loading of the optical disc, the optical disc device discriminates the type of optical disc from the detection output of the light detecting means (104) and the positional relation between the optical disc (101) and the light detecting means (104). A simple structure thus enables the optical disc type to be discriminated.

22 Claims, 19 Drawing Sheets

|     | OUT1 | OUT2 |
|-----|------|------|
| CD  | LOW  | HI   |
| DVD | HI   | HI   |
| BD  | LOW  | LOW  |

LOADING MECHANISM OPERATION

|  | OUT1 | OUT3 |
|---|---|---|
| CD | HI | HI |
| DVD | HI | LOW |
| BD | LOW | LOW |

OPTICAL DISC DISCRIMINATION METHOD, OPTICAL DISC TRANSPORT DEVICE, OPTICAL DISC DEVICE, OPTICAL DISC INSPECTION DEVICE, AND OPTICAL PICKUP INSPECTION DEVICE

FIELD OF THE INVENTION

In an optical disc device that is compatible with a plurality of types of discs having different track pitches between the recording tracks formed on the information recording surface in the optical disc, the present invention relates to an optical disc discrimination method and an optical disc device that discriminate between the different types of optical discs from the differences in their track pitch.

BACKGROUND ART

In the information recording field, developmental work related to optical discs is proceeding. Optical discs are widely employed in tasks ranging from industrial use to consumer use because recording and reproduction can take place without contact, large files can be stored at a low cost, and there are read-only, write-once, and rewritable optical discs for differing applications.

The capacities of the various optical disc types mentioned above have been increased by decreasing the size of the pits and marks etc. representing data written on the recording tracks on the information recording surface of the optical disc, by using semiconductor laser beams with shorter wavelengths for recording and reproducing, and by using objective lenses with larger numerical apertures, thereby reducing the focused spot size on the focal plane.

For example, a 650 MB capacity was achieved in a CD (compact disc) with a 1.6-μm track pitch by using an infrared laser beam with a wavelength of substantially 0.78 μm from a semiconductor laser, and an objective lens with a 0.45 numerical aperture (NA), for recording and reproducing data on the recording tracks.

Next, a 4.7 GB capacity was achieved in a DVD (digital versatile disc) with a 0.74-μm track pitch by using a red laser beam with a wavelength of substantially 0.65 μm from a semiconductor laser and a 0.6 NA objective lens for recording and reproducing data on the recording tracks.

A 25 GB capacity was achieved in a BD (Blu-ray disc) with a 0.32-μm track pitch by using a blue laser beam with a wavelength of substantially 0.405 μm from a semiconductor laser and a 0.85 NA objective lens for recording and reproducing data on the recording tracks.

Through CDs, DVDs, and BDs, optical discs have evolved toward larger capacities as described above. Upward compatibility is generally desired in optical disc equipment; at present, optical disc devices are being sold that can record and reproduce on discs of all three types: CD, DVD, and BD.

PRIOR ART REFERENCES

Patent Documents

Patent document 1: Japanese Patent Application Publication No. 10-154348

SUMMARY OF THE INVENTION

Problem to be Solved by the Invention

In an optical disc device compatible with a plurality of types of optical discs having different track pitches, before recording or reproducing, the type of optical disc inserted must be discriminated and the optical disc device must be set to operate according to the inserted type of optical disc. A method that has therefore been used to discriminate the type of optical disc in an optical disc device compatible with a plurality of types of optical discs is to detect the diffraction angle of diffracted light from a laser beam directed onto the optical disc (for example, patent document 1).

A problem with this exemplary conventional method is that it is structurally complex and requires a plurality of light detecting means in order to discriminate between different types of optical discs.

An object of the present invention is to solve the above problem by providing a structurally simple optical disc discrimination method capable of discriminating optical disc type in an optical disc device compatible with a plurality of types of optical discs having different track pitches.

Means for Solving the Problem

In an optical disc discrimination method for discriminating a type of optical disc loaded into an optical disc transport device having a loading means that moves the optical disc in a direction of an axis of rotation of a turntable, a light emitting section that directs a light beam onto the optical disc during loading, and a light detecting means disposed in a path of diffracted light from recording tracks on the optical disc when the light beam from the light emitting section is incident thereon, a novel optical disc discrimination method includes discriminating the type of optical disc loaded from the positional relation between the optical disc and the light detecting means and the detection output of the light detecting means during loading.

Effects of the Invention

The type of optical disc inserted into an optical disc device compatible with a plurality of types of optical discs having different track pitches can thereby be discriminated by a simple structure.

MODE FOR CARRYING OUT THE INVENTION

First Embodiment

Figure 1:
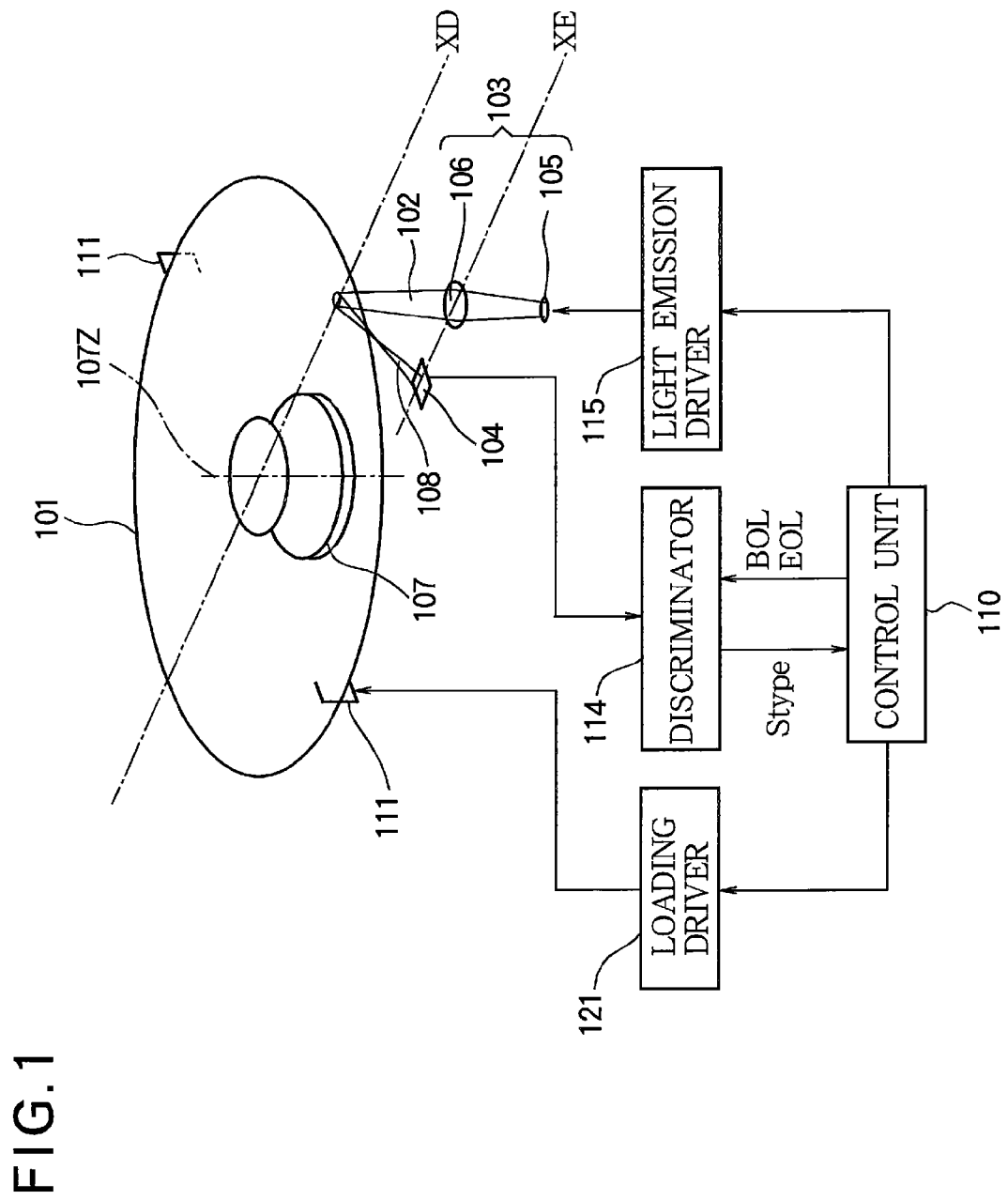
FIG. 1 schematically shows an optical disc device used in carrying out the novel optical disc discrimination method.

The first embodiment of the present invention will be described below using FIG. 1. FIG. 1 schematically shows an exemplary optical disc transport device used in carrying out the novel optical disc discrimination method. Optical disc transport devices are used as part of the apparatus constituting optical disc devices, and also as part of the apparatus constituting optical disc inspection equipment and optical pickup inspection equipment. Optical disc inspection equipment and optical pickup inspection equipment are used in the optical disc inspection process and optical pickup inspection process. The illustrated optical disc transport device has a light emitting section 103 that directs a light beam 102 onto an optical disc 101 mounted in a loading mechanism 111, a light detector 104 that functions as a light detecting means that receives the light beam 102, and a discriminator 114 that discriminates the type of optical disc that is loaded from the output signal SR of the light detector 104.

The light detector 104 has, for example, one light receiving surface, and outputs a signal according to the light received by the light receiving surface. In an example that will be described in detail later with reference to FIG. 13, the light detector 104 includes a phototransistor, and outputs a signal with a voltage value that decreases as the amount of received light increases. The discriminator 114 discriminates the type of optical disc loaded from the amount of light received by the light detector 104 as indicated by the output signal SR of the light detector 104, and the relative positional relationship between the light detector 104 and the optical disc 101 during loading indicated by a signal from a control unit 110.

The light emitting section 103 includes a light-emitting device such as an LED 105, for example, that is driven by a light emission driver 115 and emits light, and a lens 106 that focuses the light beam 102 emitted from the LED 105; the light beam 102 focused by the lens 106 is directed onto the optical disc 101 from underneath, in parallel with the axis of rotation 107Z of a turntable 107. The light beam 102 incident on the optical disc 101 produces diffracted light 108. The light emitting section 103 and the light detector 104 are disposed in positions where they do not interfere with the optical disc 101 when it is chucked onto the turntable 107, and are aligned in a radial direction of the optical disc 101 (on a line XE parallel to line a XD extending radially on the surface of the optical disc 101). The loading mechanism 111 is driven by a loading driver 121, and the loading driver 121, discriminator 114, and light emission driver 115 are controlled by the control unit 110.

Figure 2:
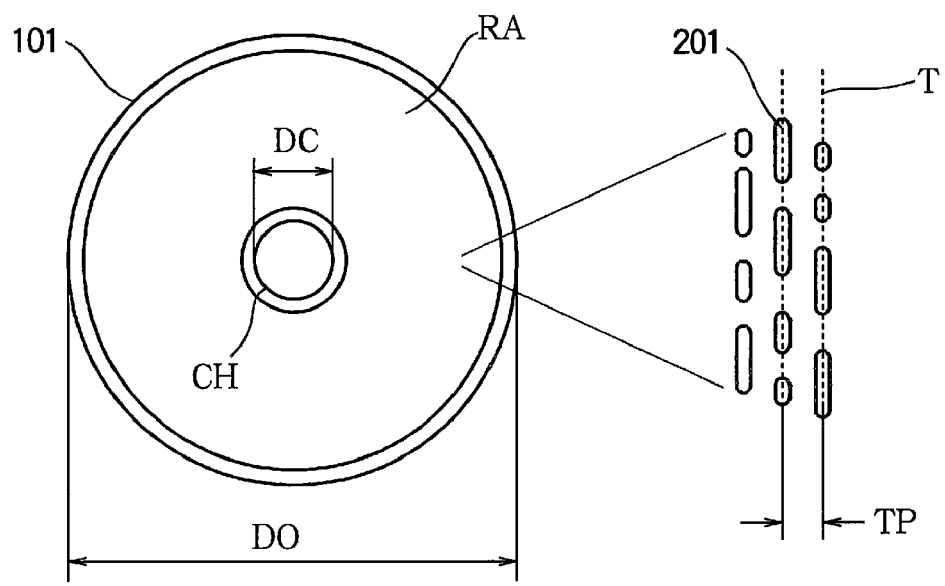
FIG. 2 shows an example of a reproduce-only optical disc.
Figure 3:
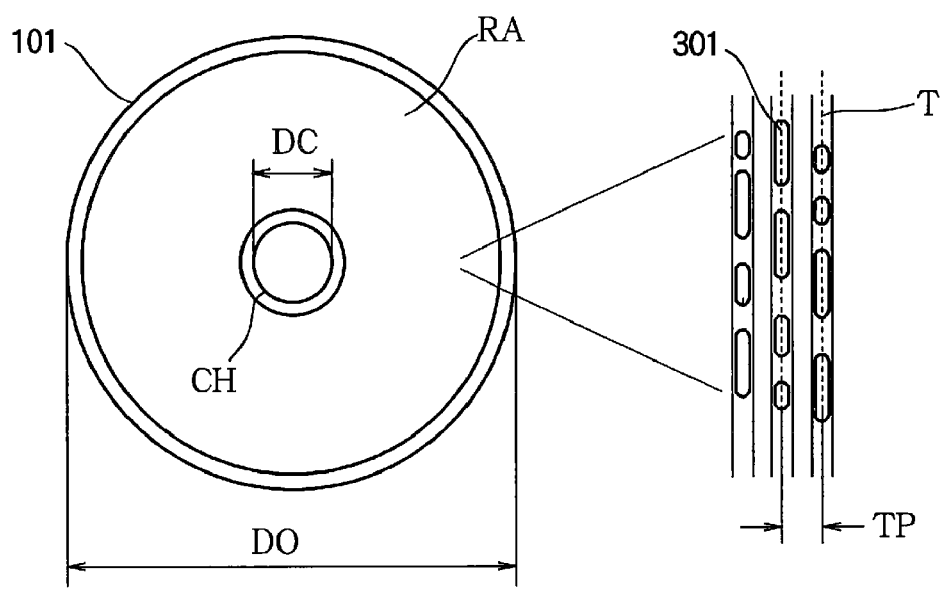
FIG. 3 shows an example of a write-once or rewritable optical disc.

Exemplary optical discs 101 are shown in FIGS. 2 and 3. In FIGS. 2 and 3, the symbol DO indicates the outside diameter, the symbol DC indicates the inside diameter (the diameter of the central hole CH), and RA indicates the recording track area (the area in which recording tracks are formed). In the recording track formation area RA of the reproduce-only optical disc shown in FIG. 2, recording tracks T are formed by rows of pits 201 with track pitch TP. In the recording track formation area RA of the write-once or rewritable optical disc shown in FIG. 3, recording tracks T on which recording marks 301 are written are formed with track pitch TP.

Taking CDs, DVDs, and BDs as examples of these optical discs 101, each has the same outside diameter, but the track pitch TP of the recording tracks T in the recording track formation area RA of a CD is 1.6 µm, the track pitch TP of the recording tracks T in the recording track formation area RA of a DVD is 0.74 µm, and the track pitch TP of the recording tracks T in the recording track formation area RA of a BD is 0.32 μm. As these figures indicate, the track pitch TP of the recording tracks T of a CD is greater than the track pitch of the recording tracks T of a DVD by substantially a factor of two.

Figure 4:
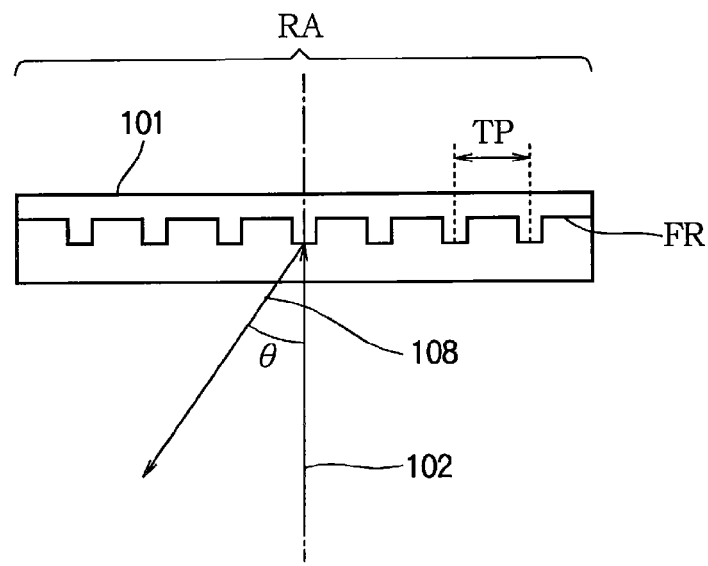
FIG. 4 illustrates the diffraction angle of a light beam diffracted by an optical disc in the first embodiment.

The sectional view in FIG. 4 illustrates the positional relationship between the optical disc 101 and the light beam 102. The light beam 102 incident on the recording track formation area RA of the optical disc 101 is reflected by a reflective layer FR, undergoing diffraction by the rows of recording tracks T formed with track pitch TP at the incident position in the recording track formation area RA. The reflected diffracted light 108 returns in a direction opposite to the direction of the light beam 102 from the light emitting section 103, traveling at a diffraction angle θ in a plane perpendicular to the recording surface of the optical disc and including the line XD extending in the radial direction of the optical disc 101. The diffraction angle θ of the first-order diffracted light satisfies the following relationship. In the following equation, λ is the wavelength of the light beam.

$$TP \cdot \sin \theta = \lambda$$

In the present invention, an LED 105 with λ=0.620 μm is used. If the diffraction angle θ of the first-order diffracted light in the above equation is calculated with λ=0.620 μm, the diffraction angle θ of the diffracted light 108 is 22.8 degrees for a CD and 56.9 degrees for a DVD; for a BD, there is no diffracted light.

Figure 5:
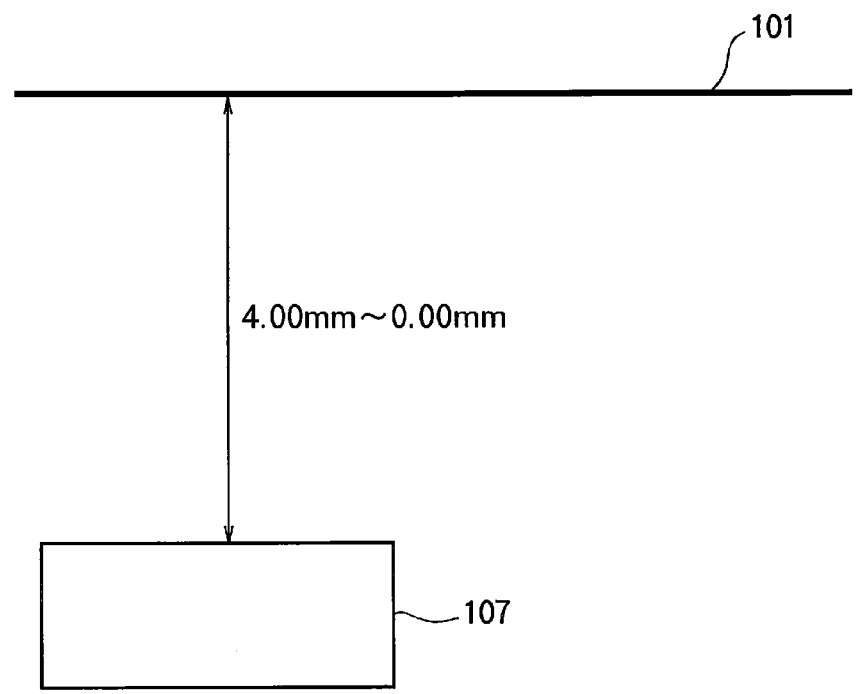
FIG. 5 illustrates the range of motion of an optical disc during a loading operation in the optical disc device.

The range over which the optical disc 101 is moved in the direction of the axis of rotation 107Z of the turntable 107 by the loading mechanism 111 is shown in FIG. 5. The loading mechanism 111 transports the optical disc 101 from 4.00 mm above the turntable 107 to a position in contact with (the disc placement surface of) the turntable 107, keeping the recording surface of the optical disc 101 perpendicular to the axis of rotation 107Z of the turntable 107.

Figure 6:
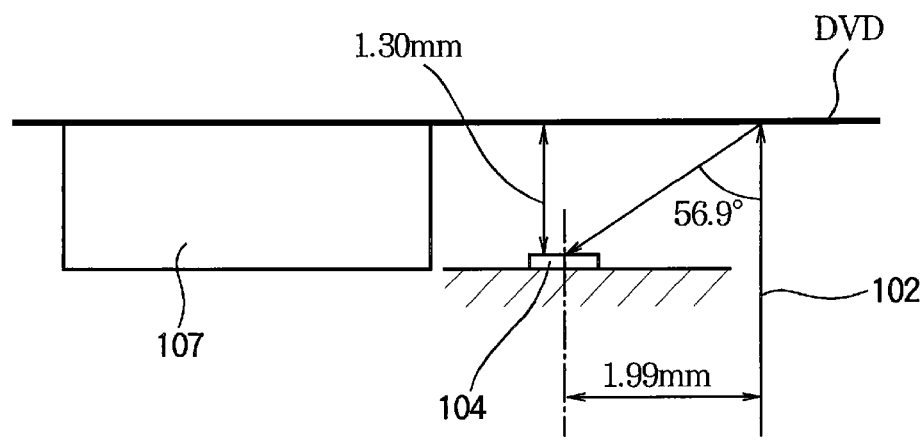
FIG. 6 illustrates the relationship between the light detector and the diffracted light when a DVD is chucked.

FIG. 6 illustrates the state when the DVD is chucked. The light detector 104 is disposed at a distance of 1.30 mm from the top surface (the disc placement surface) of the turntable and at a distance of 1.99 mm from the light beam 102 in the direction of line XD, in a position such that the diffracted light 108 of the chucked DVD is incident on the light detector 104.

Figure 7:
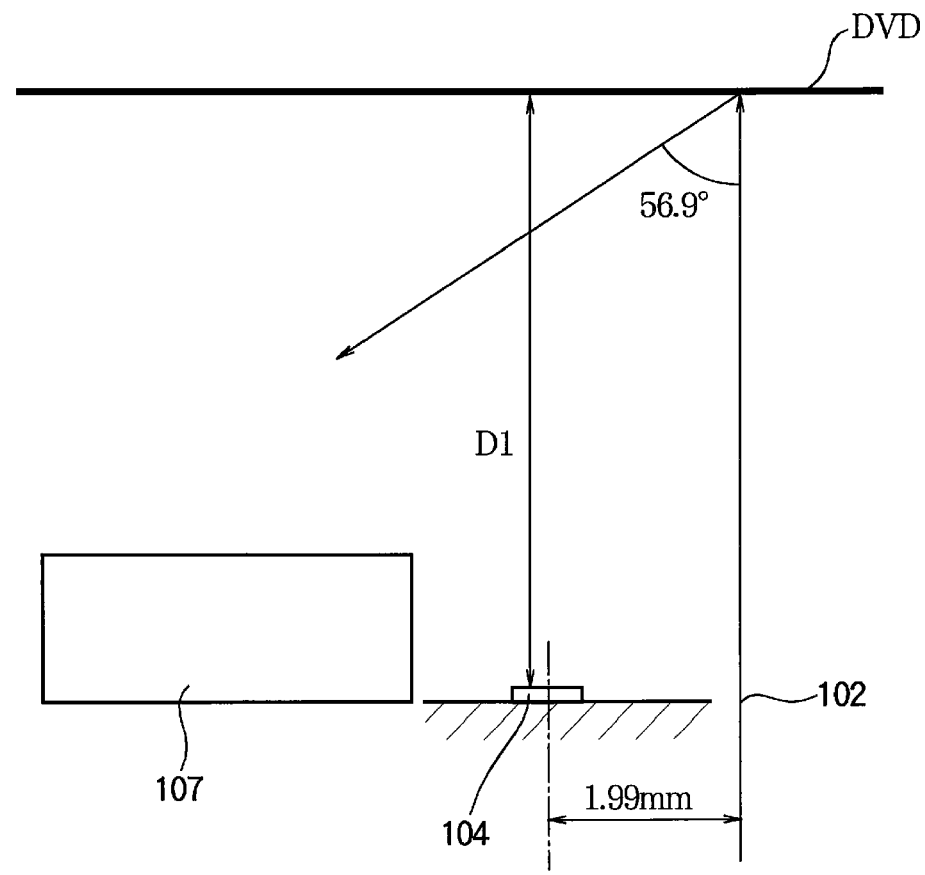
FIG. 7 illustrates the position of the disc 101 relative to the turntable 107 at the start of the loading of a DVD, and the relationship between the light detector 104 and the diffracted light 108.
Figure 8:
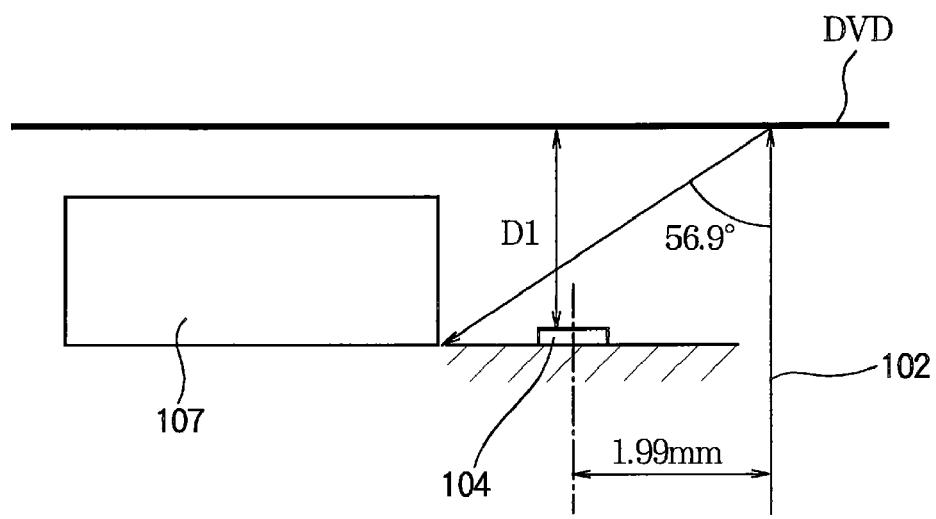
FIG. 8 illustrates the position of the disc 101 relative to the turntable 107 midway through the loading of a DVD, and the relationship between the light detector 104 and the diffracted light 108.
Figure 9:
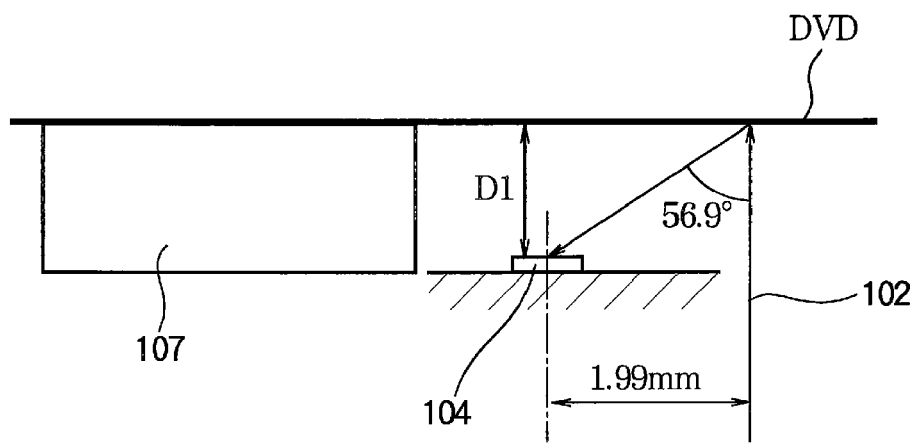
FIG. 9 illustrates the position of the disc 101 relative to the turntable 107 at the end of the loading of a DVD, and the relationship between the light detector 104 and the diffracted light 108.

Changes in the position of the optical disc 101 relative to the turntable 107 in the direction of the axis of rotation 107Z and the relationship between the light detector 104 and the diffracted light 108 during the loading of a DVD are illustrated in FIGS. 7, 8, and 9. FIG. 7 shows the state at the beginning of loading, FIG. 8 shows the state midway through loading, and FIG. 9 shows the state at the end of loading (when loading is completed and the disc is chucked onto the turntable). D1 is the distance between the optical disc 101 and the light detector 104 (in the direction parallel to the axis of rotation 107Z of the turntable). The diffracted light 108 is incident on the light detector 104 only when loading is completed as in FIG. 9.

Figure 10:
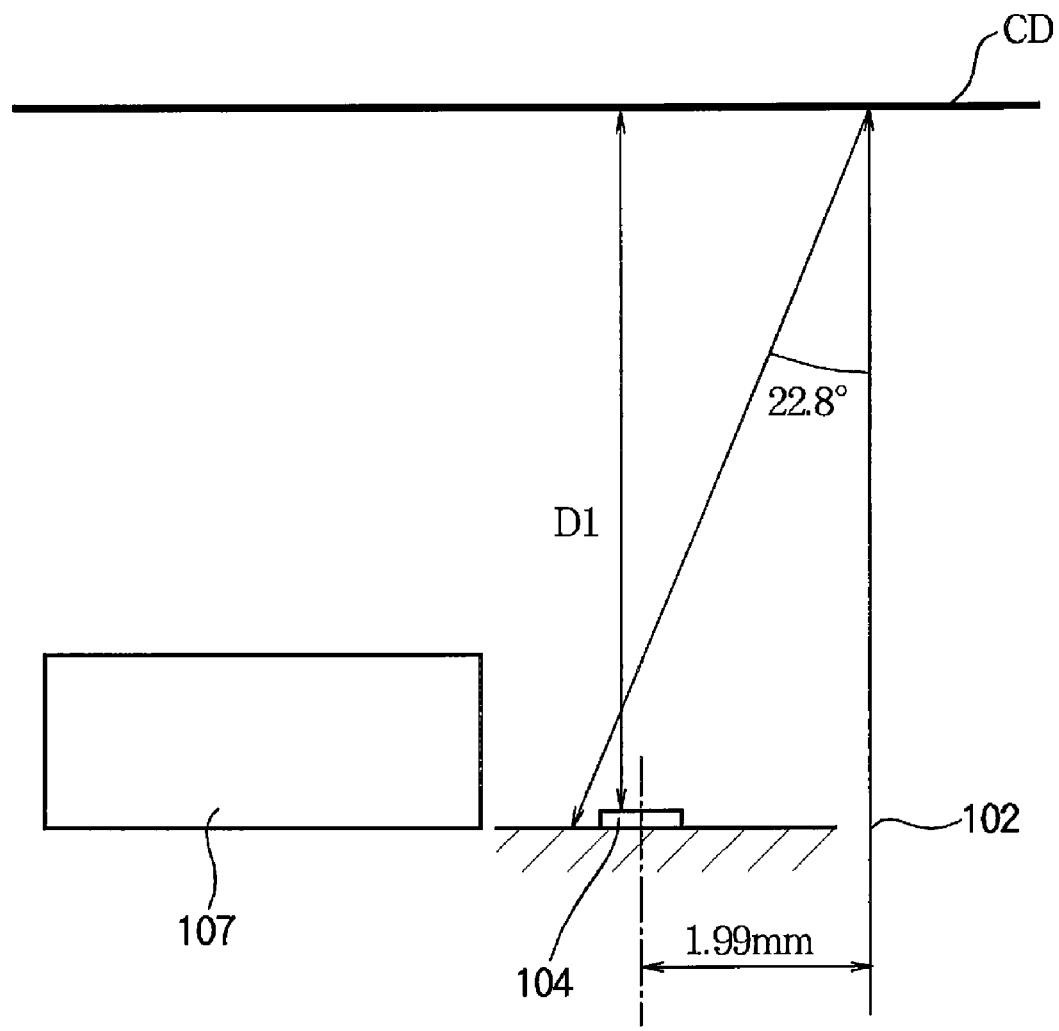
FIG. 10 illustrates the position of the disc 101 relative to the turntable 107 at the start of the loading of a CD, and the relationship between the light detector 104 and the diffracted light 108.
Figure 11:
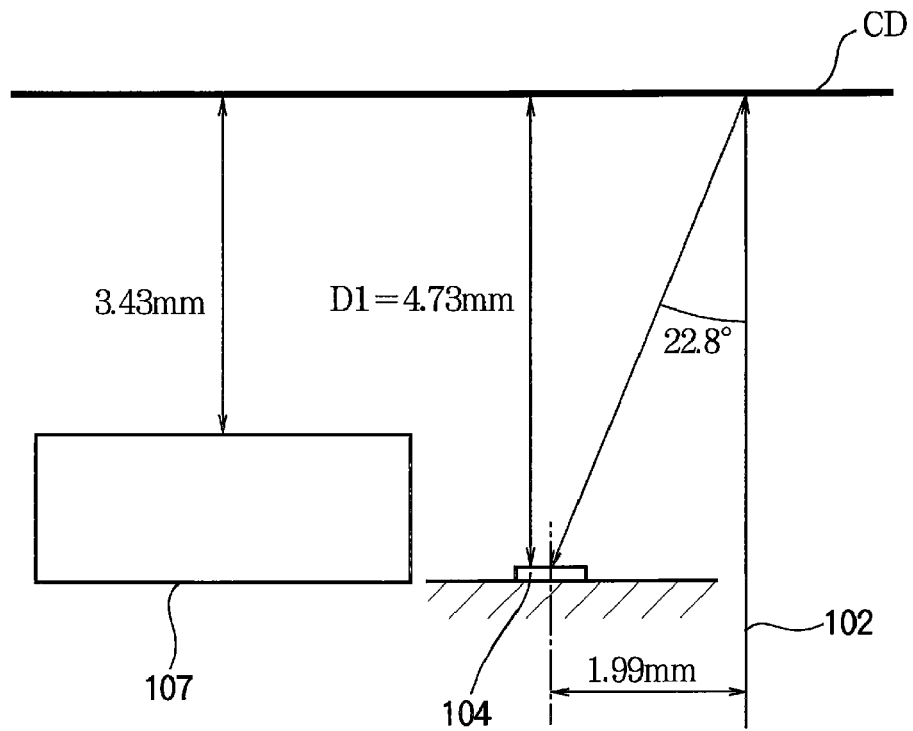
FIG. 11 illustrates the position of the disc 101 relative to the turntable 107 midway through the loading of a CD, and the relationship between the light detector 104 and the diffracted light 108.
Figure 12:
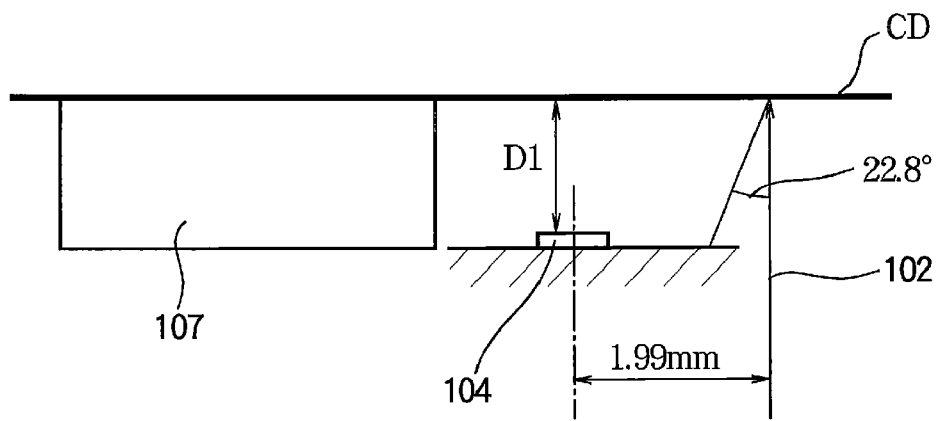
FIG. 12 illustrates the position of the disc 101 relative to the turntable 107 at the end of the loading of a CD, and the relationship between the light detector 104 and the diffracted light 108.

Changes in the position of the optical disc 101 relative to the turntable 107 in the direction of the axis of rotation 107Z and the relationship between the light detector 104 and the diffracted light 108 during the loading of a CD are illustrated in FIGS. 10, 11, and 12. FIG. 10 shows the state at the beginning of loading, FIG. 11 shows the state midway through loading, and FIG. 12 shows the state at the end of loading (when loading is completed and the disc is chucked onto the turntable). D1 is the distance between the optical disc 101 and the light detector 104. The diffracted light 108 is incident on the center of the light detector 104 when D1=4.73 mm, midway through loading in FIG. 11.

Figure 13:
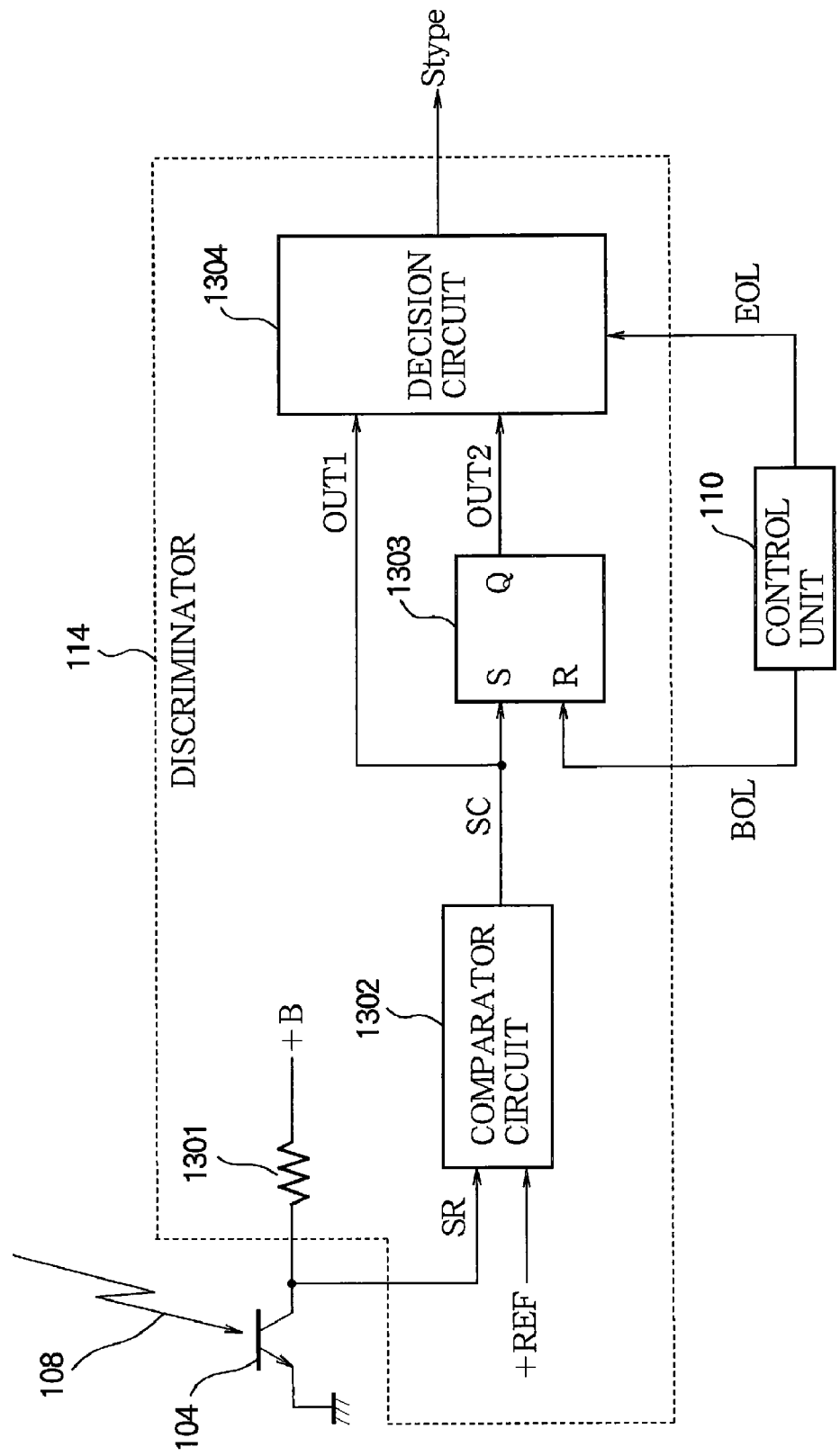
FIG. 13 is a circuit diagram showing the discriminator 114 and the light detector 104 that detects the diffracted light.

The light detector 104 that detects the diffracted light 108 and the discriminator 114 are shown in FIG. 13. The light detector 104 is a phototransistor supplied with an operating voltage from a power supply +B via a resistor 1301. The detection output signal SR obtained by detection of the diffracted light 108 by the light detector 104 is supplied to a comparator circuit 1302.

The comparator circuit 1302 compares the detection output signal SR with a reference voltage +REF and outputs a signal SC indicating the result (indicating whether diffracted light 108 is incident on the light detector 104). When diffracted light 108 is incident on the phototransistor, signal SR has a lower potential than +B. As the amount of incident diffracted light 108 increases, the potential of signal SR approaches ground level. The comparator circuit 1302 compares the potential of signal SR with the reference voltage +REF, drives signal SC to the High level when the potential of signal SR is lower than the reference voltage +REF, and drives signal SC to the Low level when the potential of signal SR is higher than the reference voltage +REF. Signal SC is output as an output signal OUT1, and is supplied to an RS flip-flop 1303 as a set signal. As a reset signal, the RS flip-flop 1303 receives a signal BOL indicating the beginning of loading. The output from the RS flip-flop 1303 is denoted OUT2.

Figure 14:
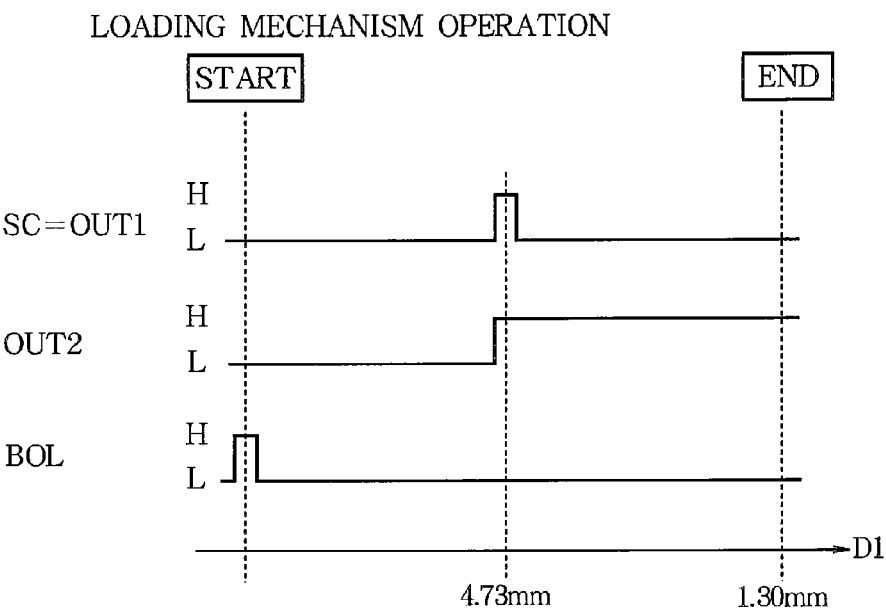
FIG. 14 illustrates signal changes during loading when the optical disc is a CD.

The signal changes that occur with changes in distance D1 during loading when the optical disc is a CD are illustrated in FIG. 14. At the start of the operation of the loading mechanism, the control unit 110 drives signal BOL to the High level indicating the beginning of loading, and applies this signal to the reset input terminal R of the RS flip-flop 1303. The result is that the output from the RS flip-flop 1303 goes Low. Signal SC goes High for a while in the neighborhood of D1=4.73 mm because of the diffracted light from the CD, and is Low thereafter. Signal OUT2 is High from D1=4.73 mm onward because of signal SC. At the end of the operation of the loading mechanism, signal OUT1 is Low and signal OUT2 is High.

Figure 15:
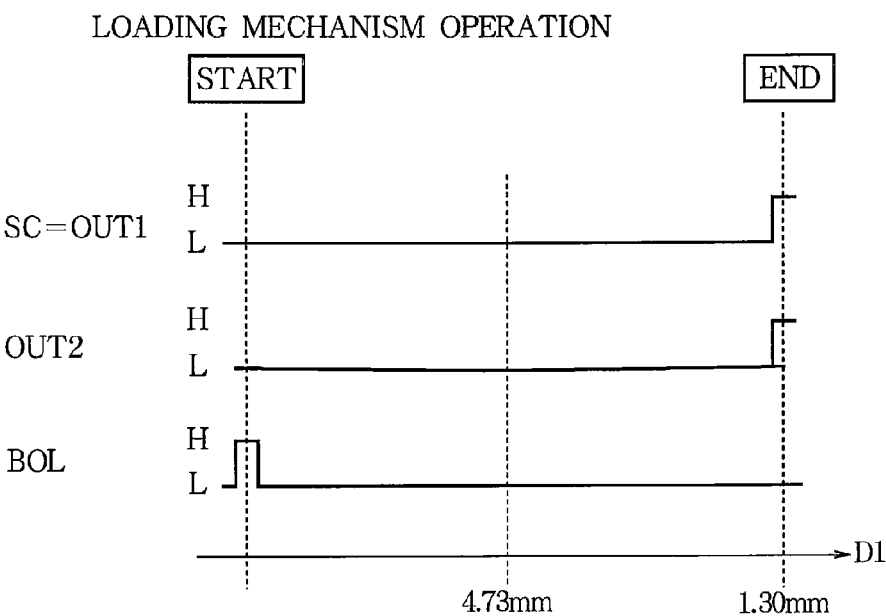
FIG. 15 illustrates signal changes during loading when the optical disc is a DVD.

The signal changes that occur with changes in distance D1 during loading when the optical disc is a DVD are illustrated in FIG. 15. As in FIG. 14, at the start of the operation of the loading mechanism the control unit 110 drives signal BOL to the High level indicating the beginning of loading, and applies this signal to the reset input terminal R of the RS flip-flop 1303. The result is that the output from the RS flip-flop 1303 goes Low. Signal SC goes High in the neighborhood of D1=1.30 mm because of the diffracted light from the DVD. Signal OUT2 is High from D1=1.30 mm onward because of signal SC. Therefore, at the end of the operation of the loading mechanism, both signals OUT1 and OUT2 are High.

Figures 16, 17:
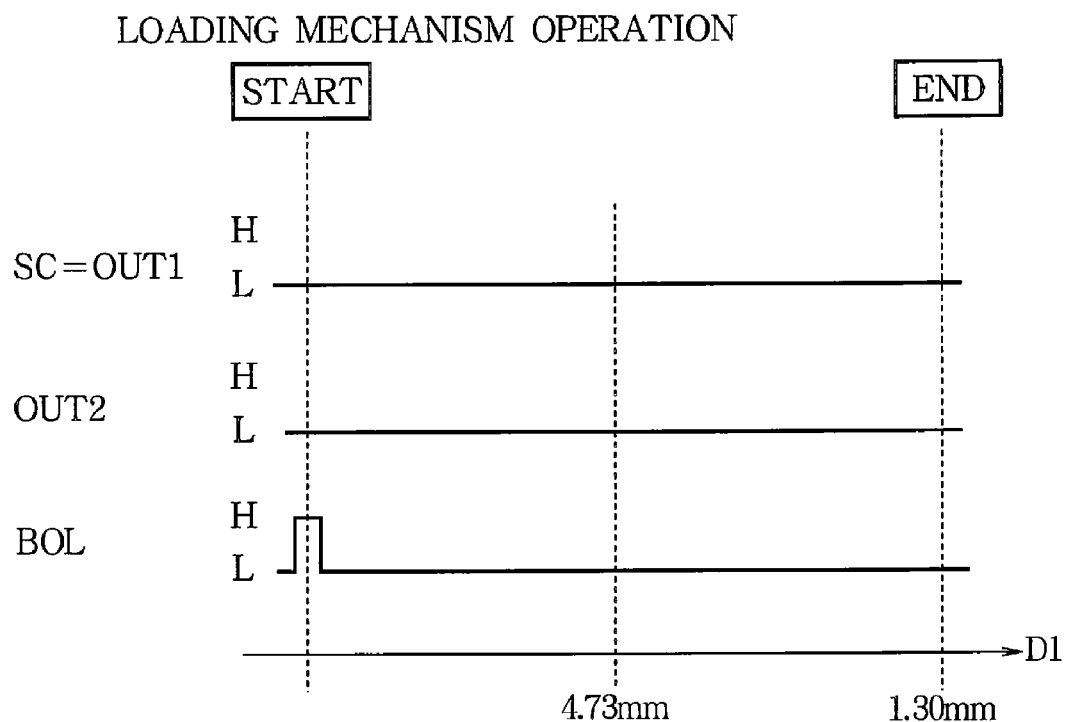
FIG. 16 illustrates signal changes during loading when the optical disc is a BD.
FIG. 17 is a table indicating the relationship between disc type and the levels of the OUT1 and OUT2 signals at the end of loading.

The signal changes that occur with changes in distance D1 during loading when the optical disc is a BD are illustrated in FIG. 16. As in FIGS. 14 and 15, at the start of the operation of the loading mechanism the control unit 110 drives signal BOL to the High level indicating the beginning of loading, and applies this signal to the reset input terminal R of the RS flip-flop 1303. The result is that the output from the RS flip-flop 1303 goes Low. Even when D1 reaches 1.30 mm at the end of the operation of the loading mechanism, because the diffracted light from the BD is never incident on the light detector 104, both signals OUT1 and OUT2 are Low.

A table of disc types and the states of signals OUT1 and OUT2 at the end of the operation of the loading mechanism is shown in FIG. 17. A decision circuit 1304 determines the disc type from the state of signals OUT1 and OUT2 at the end of the operation of the loading mechanism according to the table shown in FIG. 17. More specifically, when signal EOL is supplied from the control unit 110 at the end of the operation of the loading mechanism, if signal OUT1 is Low and signal OUT2 is High, the decision circuit 1304 decides that the optical disc is a CD, if both signals OUT1 and OUT2 are High, the decision circuit 1304 decides that the optical disc is a DVD, if both signals OUT1 and OUT2 are Low, the decision circuit 1304 decides that the optical disc is a BD;

otherwise (if OUT1 is High and OUT2 is Low), the decision circuit 1304 decides that an error has occurred.

A signal indicating the decided result is output from the discriminator 114 as a type discrimination signal Stype.

In this way the optical disc transport device described above automatically discriminates whether the optical disc 101 is a CD, a DVD, or a BD during the loading of the disc, and signal Stype indicates the result.

In the circuit shown in FIG. 13 in this example, the reset signal BOL is supplied from the control unit 110 at the beginning of loading, and the decision circuit 1304 receives signal EOL from the control unit 110 at the end of loading. The present invention is not restricted to this example, however; it may be configured so that the control unit 110 supplies the discriminator 114 with a signal indicating the positional relationship between the optical disc and the light detector during loading and the discriminator 114 discriminates the type of optical disc from the signal indicating the positional relationship and the output signal SR from the light detector 104.

As described above, the optical disc discrimination method according to the present invention enables a single light detecting means to discriminate a plurality of types of optical discs. The type of optical disc inserted into an optical disc device compatible with a plurality of types of optical discs having different track pitches, such as a tabletop optical disc device or a car optical disc device, can thereby be discriminated by a simple structure.

Second Embodiment

Figure 18:
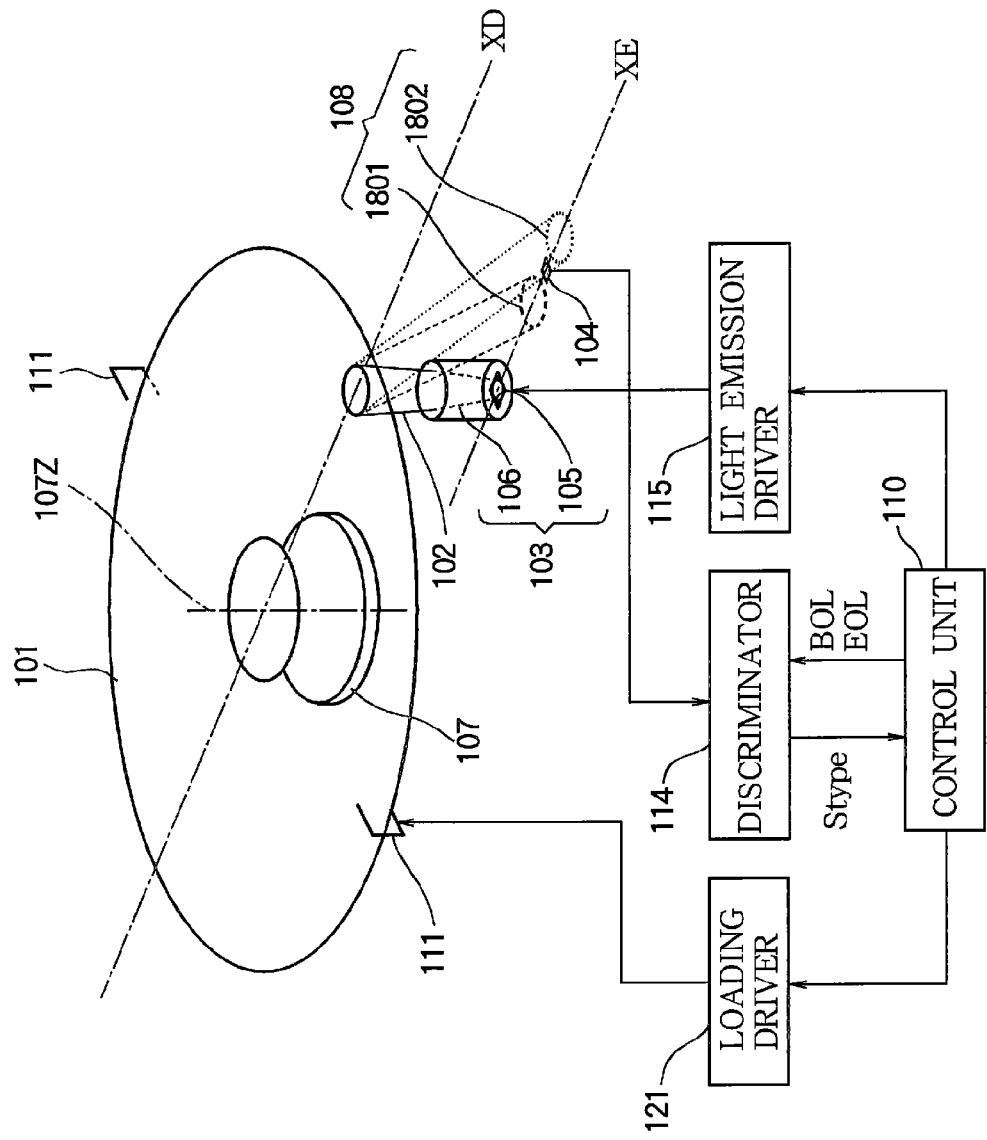
FIG. 18 schematically illustrates an optical disc transport device used in carrying out the novel optical disc discrimination method.

The second embodiment of the present invention will be described using FIG. 18. FIG. 18 schematically shows an exemplary optical disc transport device used in carrying out the novel optical disc discrimination method. Optical disc transport devices are used as part of the apparatus constituting optical disc devices, and also as part of the apparatus constituting optical disc inspection equipment and optical pickup inspection equipment. Optical disc inspection equipment and optical pickup inspection equipment are used in the optical disc inspection process and optical pickup inspection process. The optical disc transport device illustrated in FIG. 18 has a light emitting section 103 that directs a light beam 102 onto an optical disc 101 mounted in a loading mechanism 111, a light detector 104 that functions as a light detecting means that receives the light beam 102, and a discriminator 114 that discriminates the type of optical disc that is loaded from the output signal SR of the light detector 104.

The light detector 104 has, for example, one light receiving surface, and outputs a signal according to the light received by the light receiving surface. In an example that will be described in detail later with reference to FIG. 28, the light detector 104 includes a phototransistor, and outputs a signal with a voltage value that decreases as the amount of received light increases. The discriminator 114 discriminates the type of optical disc loaded from the relative positional relationship between the light detector 104 and the optical disc 101 during loading, the amount of light received by the light detector 104 as indicated by the output signal SR of the light detector 104, and the relative positional relationship between the light detector 104 and the optical disc 101 during loading indicated by a signal from a control unit 110.

The light emitting section 103 includes a light-emitting device such as an LED 105, for example, that is driven by a light emission driver 115 and emits light, and a lens 106 that focuses the light beam 102 emitted from the LED 105. The LED 105 is a small surface-mounted LED. The lens 106 is a molded-plastic device shaped to cover the LED 105. The light beam 102 focused by the lens 106 is directed onto the optical disc 101 from underneath, in parallel with the axis of rotation 107Z of a turntable 107. The light beam 102 incident on the optical disc 101 produces first-order diffracted light 1801. Second-order diffracted light 1802 may be simultaneously produced, depending on the type of optical disc 101. The light emitting section 103 and the light detector 104 are disposed in positions where they do not interfere with the optical disc 101 when it is chucked onto the turntable 107, and are aligned in a radial direction of the optical disc 101 (on a line XE parallel to line a XD extending radially on the surface of the optical disc 101). Seen from the turntable in the center, the light detector 104 is disposed outward of the light emitting section 103. The loading mechanism 111 is driven by a loading driver 121, and the loading driver 121, discriminator 114, and light emission driver 115 are controlled by the control unit 110.

Exemplary optical discs 101 are shown in FIGS. 2 and 3. In FIGS. 2 and 3, the symbol DO indicates the outside diameter, the symbol DC indicates the inside diameter (the diameter of the central hole CH), and RA indicates the recording track formation area (the area in which recording tracks are formed). In the recording track formation area RA of the reproduce-only optical disc shown in FIG. 2, recording tracks T are formed by rows of pits 201 with track pitch TP. In the recording track formation area RA of the write-once or rewritable optical disc shown in FIG. 3, recording tracks T on which recording marks 301 are written are formed with track pitch TP.

Taking CDs, DVDs, and BDs as examples of these optical discs 101, each has the same outside diameter, the track pitch TP of the recording tracks T in the recording track formation area RA of a CD is 1.6 μm, the track pitch TP of the recording tracks T in the recording track formation area RA of a DVD is 0.74 μm, and the track pitch TP of the recording tracks T in the recording track formation area RA of a BD is 0.32 μm. As these figures indicate, the track pitch TP of the recording tracks T of a CD is greater than the track pitch of the recording tracks T of a DVD by substantially a factor of two.

Figure 19:
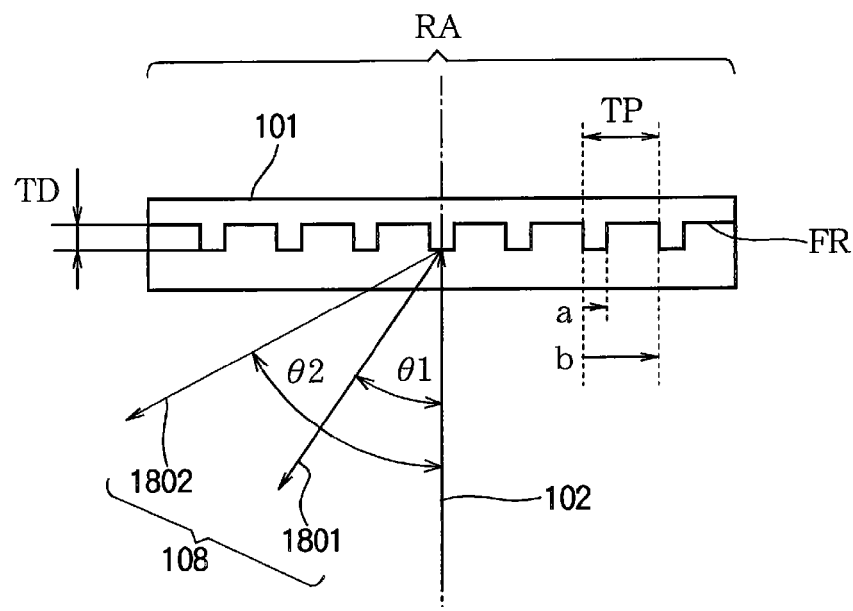
FIG. 19 illustrates the diffraction angle of a light beam diffracted by an optical disc in the second embodiment.

The sectional view in FIG. 19 illustrates the positional relationship between the optical disc 101 and the light beam 102. The light beam 102 incident on the recording track formation area RA of the optical disc 101 is transmitted through a transparent layer 1901 with a refractive index n_CL and is reflected by a reflective layer FR, undergoing diffraction by the rows of recording tracks T formed with track pitch TP at the incident position in the recording track formation area RA. The reflected diffracted light 108 returns in a direction opposite to the direction of the light beam 102 from the light emitting section 103. Of the diffracted light, the first-order diffracted light 1801 travels at a diffraction angle θ1 in a plane perpendicular to the recording surface of the optical disc and including the line XD extending in the radial direction of the optical disc 101. The diffraction angle θ1 of the first-order diffracted light satisfies the following relationship. In the following equation, λ is the wavelength of the light beam.

$$TP \cdot \sin \theta 1 = \lambda$$

Of the diffracted light 108, the second-order diffracted light 1802 travels at a diffraction angle θ2 in a plane perpendicular to the recording surface of the optical disc and including the line XD extending in the radial direction of the optical disc 101. The diffraction angle θ2 of the second-order diffracted light satisfies the following relationship. In the following equation, λ is the wavelength of the light beam.

TP·sin θ2=2·λ

In the present invention, an LED 105 with λ=0.620 μm is used. If the θ values appearing in the above equations are calculated with λ=0.620 μm, the diffraction angle θ1 of the first-order diffracted light 1801 is 22.8 degrees for a CD and 56.9 degrees for a DVD; for a BD, there is no diffracted light. The diffraction angle θ2 of the second-order diffracted light 1802 is 50.8 degrees for a CD; for a DVD or a BD, there is no diffracted light.

In FIG. 19, TD represents the depth of the recording tracks T, and 'a' and 'b' represent the duty cycle of the recording tracks T. The phase difference φ produced in the reflected light by the depth of the recording tracks T is given by the following equation.

$$\phi = 2\pi \cdot \frac{2 \cdot n\_CL \cdot TD}{\lambda}$$

In this equation, n_CL indicates the refractive index of the transparent layer 1901, as noted above.

The diffraction efficiency I_1 of the first-order diffracted light 1801 is given by the following equation.

$$I\_1 = \left| \int_0^{a/b} \exp[-i2\pi x]dx + \int_{a/b}^1 \exp(-i\phi) \cdot \exp[-i2\pi x]dx \right|^2$$

The diffraction efficiency I_2 of the second-order diffracted light 1802 is given by the following equation.

$$I\_2 = \left| \int_0^{a/b} \exp[-i4\pi x]dx + \int_{a/b}^1 \exp(-i\phi) \cdot \exp[-i4\pi x]dx \right|^2$$

If a≠b, then I_2≠0, so second-order diffracted light is produced. Second-order diffracted light is produced for a CD because a≠b for a CD.

Figure 20:
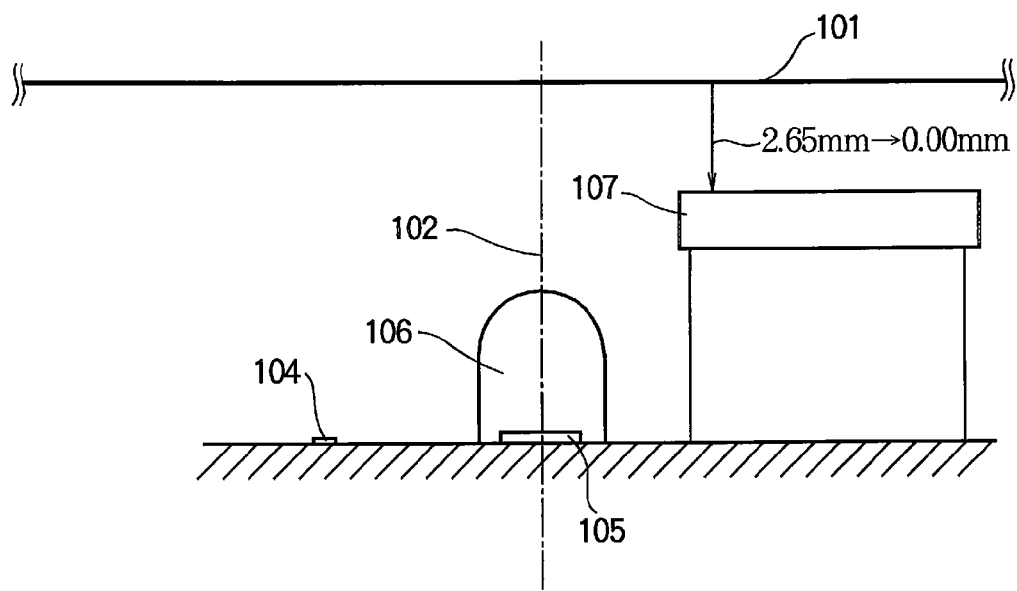
FIG. 20 illustrates the range of motion of an optical disc during a loading operation in the optical disc device.

The range over which the optical disc 101 is moved in the direction of the axis of rotation 107Z of the turntable 107 by the loading mechanism 111 is shown in FIG. 20. The loading mechanism 111 transports the optical disc 101 from 2.65 mm above the turntable 107 to a position in contact with (the disc placement surface of) the turntable 107, keeping the recording surface of the optical disc 101 perpendicular to the axis of rotation 107Z of the turntable 107.

Figure 21:
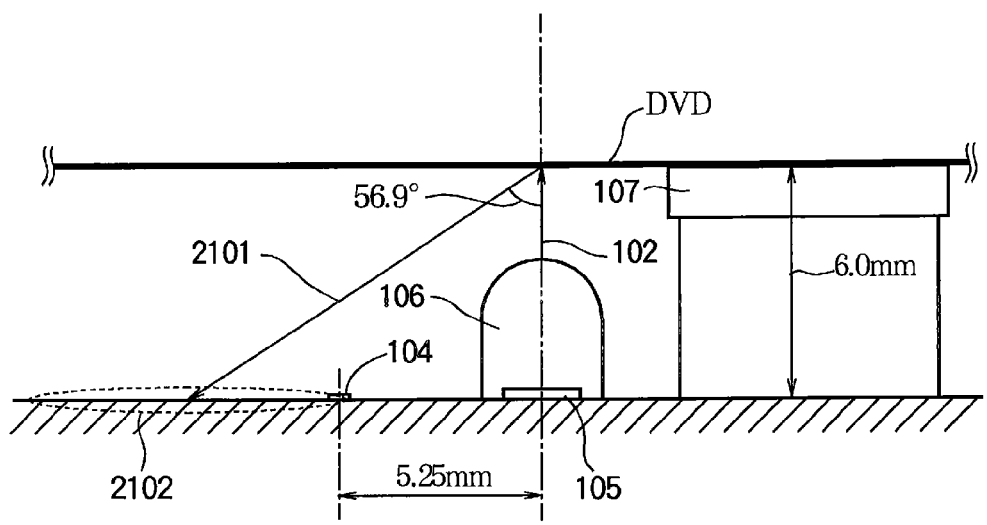
FIG. 21 illustrates the relationship between the light detector and the diffracted light when a DVD is chucked.

FIG. 21 illustrates the state when the DVD is chucked. The light receiving surface of the light detector 104 is a square measuring 0.25 mm on a side, and the diameter of the spot 2102 of the first-order diffracted light 2101 of the DVD is 8.4 mm. The light detector 104 is disposed in a plane 6.00 mm distant from the top surface (the disc placement surface) of the turntable and is 5.25 mm distant from the light beam 102 in the direction of line XD, in a position within the spot 2102 so that the first-order diffracted light 2101 is incident on the light detector 104.

Figure 22:
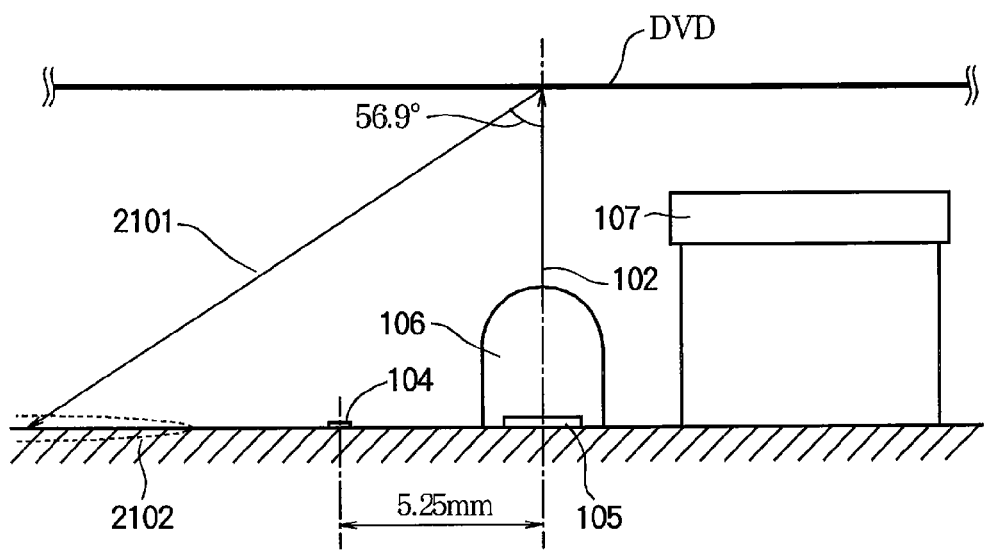
FIG. 22 illustrates the position of a DVD relative to the turntable 107 at the start of the loading of the DVD, and the relationship between the light detector 104 and the spot 2102.
Figure 23:
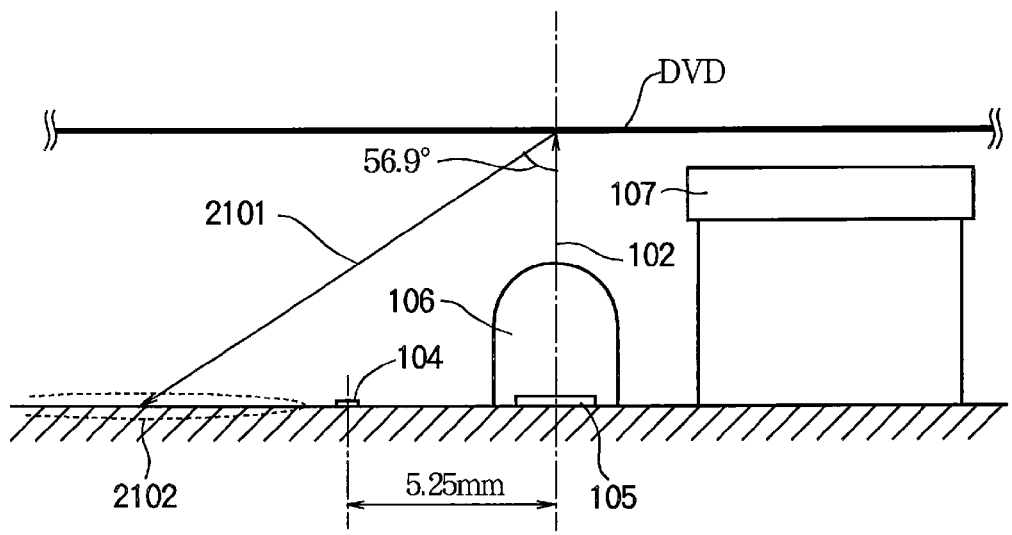
FIG. 23 illustrates the position of a DVD relative to the turntable 107 midway through the loading of the DVD, and the relationship between the light detector 104 and the spot 2102.
Figure 24:
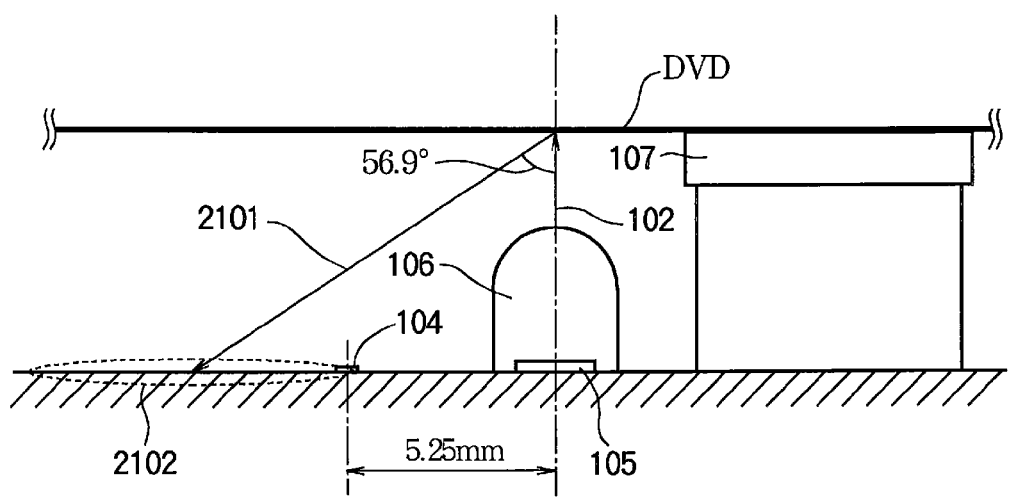
FIG. 24 illustrates the position of a DVD relative to the turntable 107 at the end of the loading of the DVD, and the relationship between the light detector 104 and the spot 2102.

Changes in the position of the optical disc 101 relative to the turntable 107 in the direction of the axis of rotation 107Z and the relationship between the light detector 104 and the spot 2102 during the loading of a DVD are illustrated in FIGS. 22, 23, and 24. FIG. 22 shows the state at the beginning of loading, FIG. 23 shows the state midway through loading, and FIG. 24 shows the state at the end of loading (when loading is completed and the disc is chucked onto the turntable). The light detector 104 is within the spot 2102 and the first-order diffracted light 2101 is incident on the light detector 104 only when loading is completed as in FIG. 24.

Figure 25:
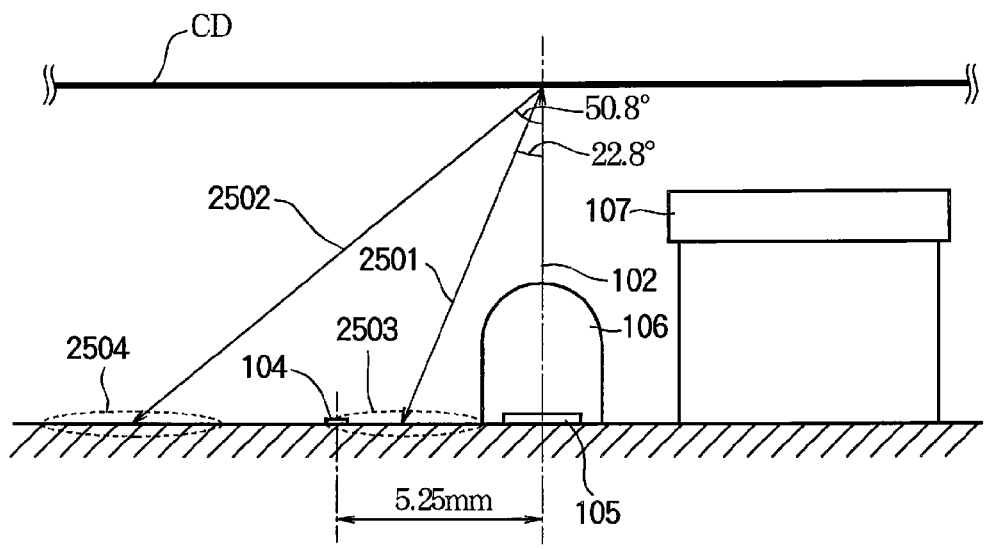
FIG. 25 illustrates the position of a CD relative to the turntable 107 at the start of the loading of the CD, and the relationship between the light detector 104 and the spots 2503, 2504.
Figure 26:
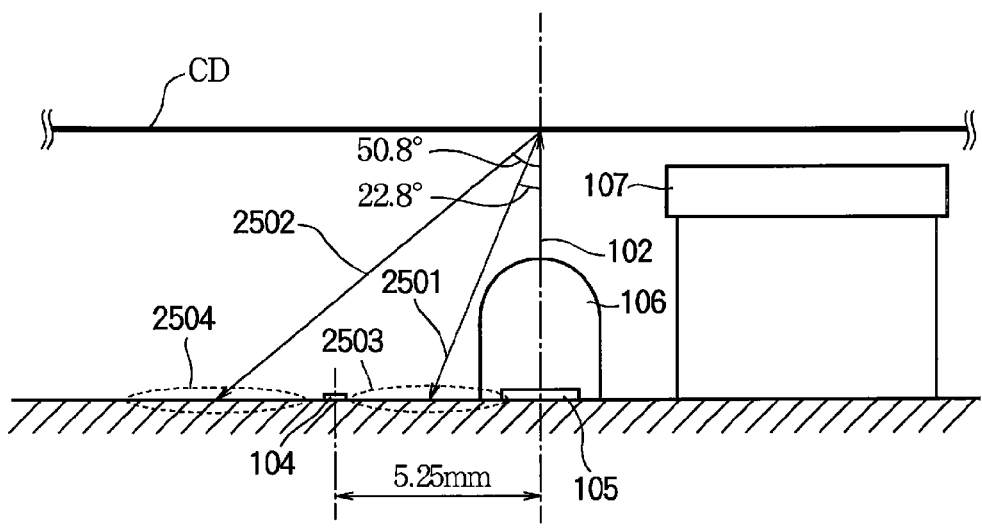
FIG. 26 illustrates the position of a CD relative to the turntable 107 midway through the loading of the CD, and the relationship between the light detector 104 and the spots 2503, 2504.
Figure 27:
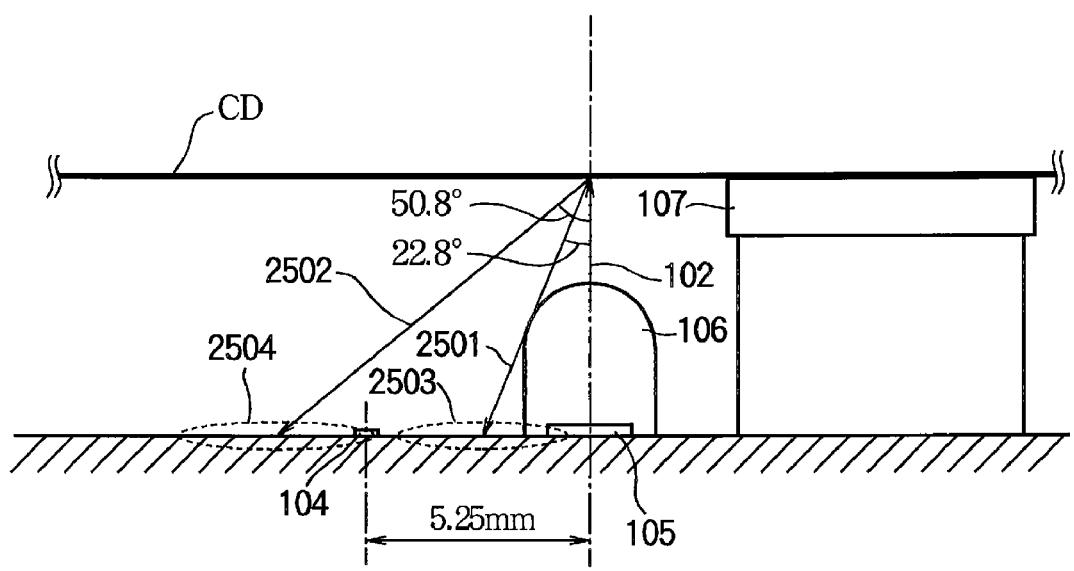
FIG. 27 illustrates the position of a CD relative to the turntable 107 at the end of the loading of the CD, and the relationship between the light detector 104 and the spots 2503, 2504.

Changes in the position of the optical disc 101 relative to the turntable 107 in the direction of the axis of rotation 107Z and the relationship between the light detector 104 and the first-order diffracted light 2501 and second-order diffracted light 2502 from a CD during the loading of the CD are illustrated in FIGS. 25, 26, and 27. The spot 2503 of first-order diffracted light 2501 from the CD is 4.0 mm in diameter. The spot 2504 of second-order diffracted light 2502 from the CD is 4.6 mm in diameter. FIG. 25 shows the state at the beginning of loading, FIG. 26 shows the state midway through loading, and FIG. 27 shows the state at the end of loading (when loading is completed and the disc is chucked onto the turntable). At the beginning of loading, the light detector 104 is within spot 2503 and the first-order diffracted light 2501 is incident on the light detector 104. Neither first-order diffracted light 2501 nor second-order diffracted light 2502 is incident on the light detector 104 during loading. At the end of loading, the light detector 104 is within spot 2504 and the second-order diffracted light 2502 is incident on the light detector 104.

Figure 28:
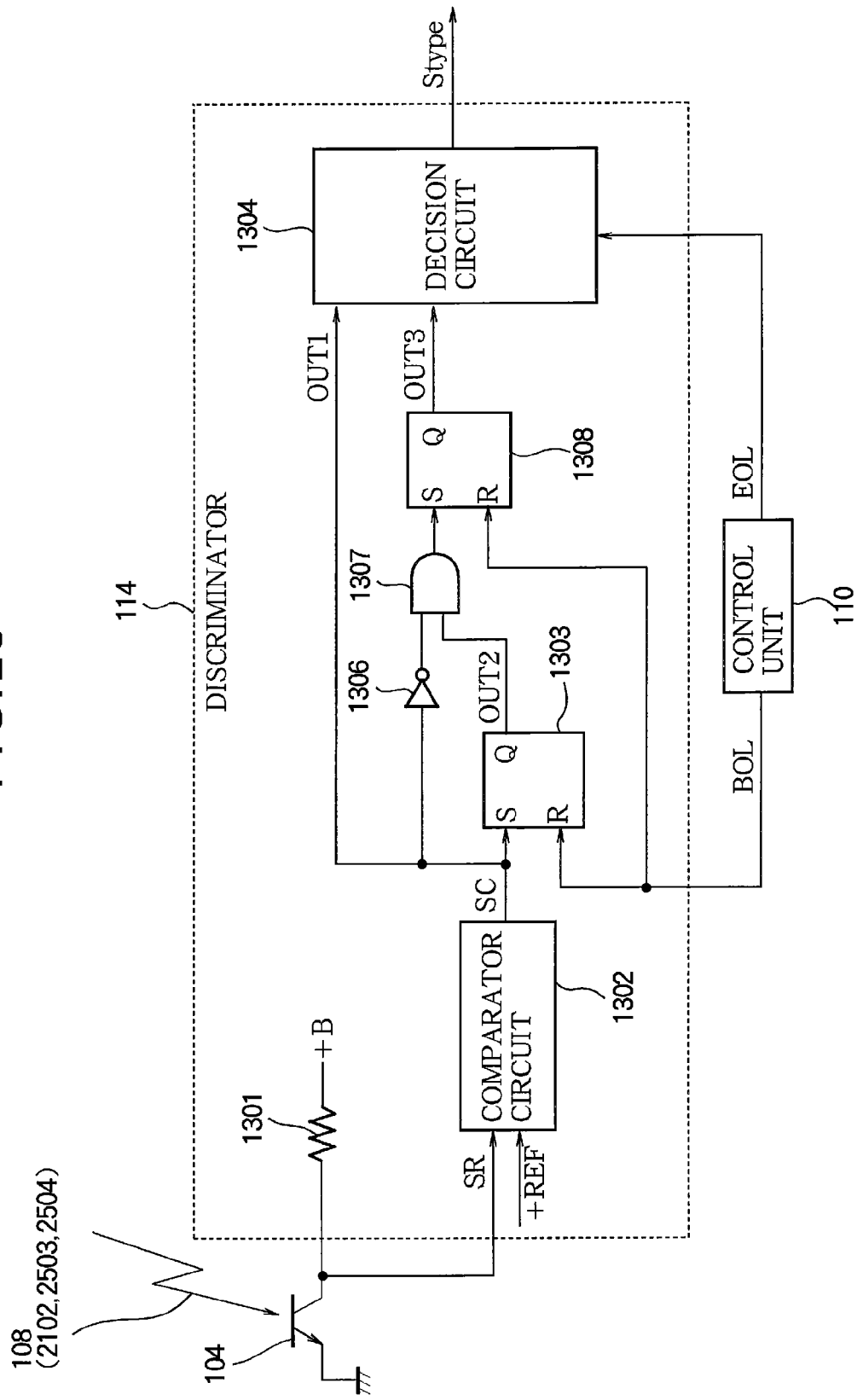
FIG. 28 is a circuit diagram showing the light detector 104 and the discriminator 114.

The discriminator 114 and the light detector 104 that detects the diffracted light forming the spots 2102, 2503, 2504 are shown in FIG. 28.

The light detector 104 is a phototransistor supplied with an operating voltage from a power supply +B via a resistor 1301. The detection output signal SR is obtained by detection of the diffracted light forming the spots 2102, 2503, and 2504 by the light detector 104.

The comparator circuit 1302 compares the detection output signal SR with a reference voltage +REF and outputs a signal SC indicating the result (indicating whether diffracted light 108 is incident on the light detector 104). When diffracted light 108 is incident on the phototransistor, signal SR has a lower potential than +B. As the amount of incident diffracted light 108 increases, the potential of signal SR approaches ground level. The comparator circuit 1302 compares the potential of signal SR with the reference voltage +REF, drives signal SC to the High level when the potential of signal SR is lower than the reference voltage +REF, and drives signal SC to the Low level when the potential of signal SR is higher than the reference voltage +REF. Signal SC is output as an output signal OUT1, and is supplied to an inverter 1306 and to an RS flip-flop 1303 as a set signal. As a reset signal, RS flip-flop 1303 receives a signal BOL indicating the beginning of loading. The output Q from RS flip-flop 1303 is denoted OUT2. An AND gate 1307 takes the logical product of the output from the inverter 1306 and the output OUT2 from RS flip-flop 1303, and supplies a signal to an RS flip-flop 1308 as a set signal. As a reset signal, RS flip-flop 1308 receives the signal BOL. The output Q from RS flip-flop 1308 is denoted OUT3.

Figure 29:
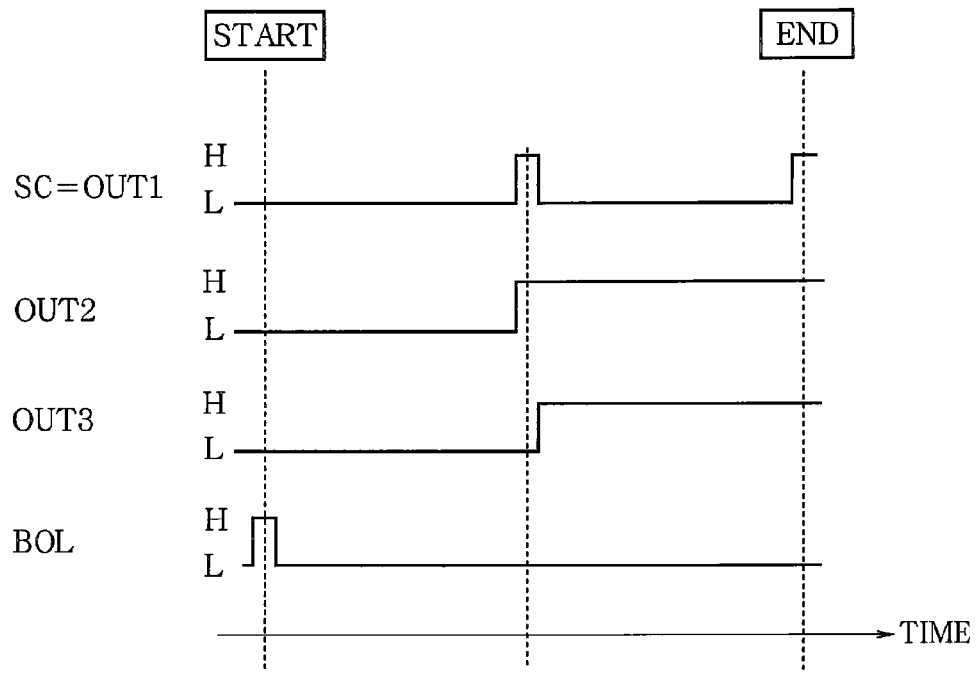
FIG. 29 illustrates signal changes during loading when the optical disc is a CD.

The signal changes when the optical disc is a CD are illustrated in FIG. 29. At the start of the operation of the loading mechanism, the control unit 110 drives signal BOL to the High level indicating the beginning of loading, and applies this signal to the reset input terminals R of the RS flip-flops 1303 and 1308. The result is that the outputs OUT2 and OUT3 from the RS flip-flops 1303 and 1308 go Low. Signal SC goes High for a while because of the first-order diffracted light from the CD. Signal SC then goes Low, but goes High again because of the second-order diffracted light from the CD at the end of the operation of the loading mechanism. Signal OUT3 is High because of signal SC and signal OUT2. At the end of the operation of the loading mechanism, signal OUT1 is Low and signal OUT3 is High.

Figure 30:
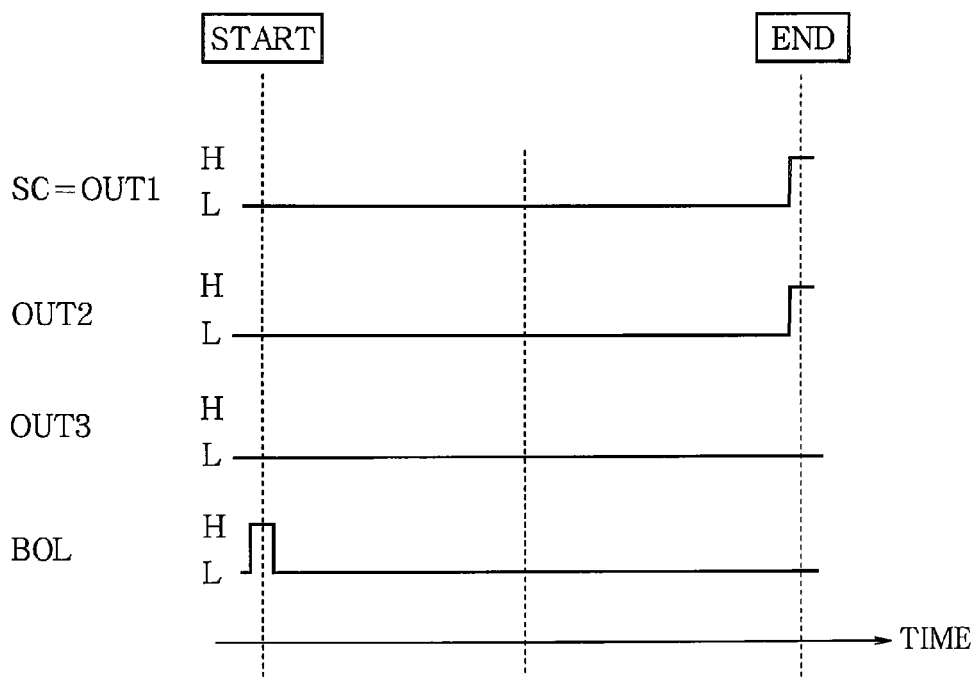
FIG. 30 illustrates signal changes during loading when the optical disc is a DVD.

The signal changes when the optical disc is a DVD are illustrated in FIG. 30. As in FIG. 29, at the start of the operation of the loading mechanism, the control unit 110 drives signal BOL to the High level indicating the beginning of loading, and applies this signal to the reset input terminals R of the RS flip-flops 1303 and 1308. The result is that the outputs OUT2 and OUT3 from the RS flip-flops 1303 and 1308 go Low. Signal SC goes High because of the diffracted light from the DVD. Signal OUT3 remains Low because of signal SC and signal OUT2. Therefore, at the end of the operation of the loading mechanism, signal OUT1 is High and signal OUT3 is Low.

Figures 31, 32:
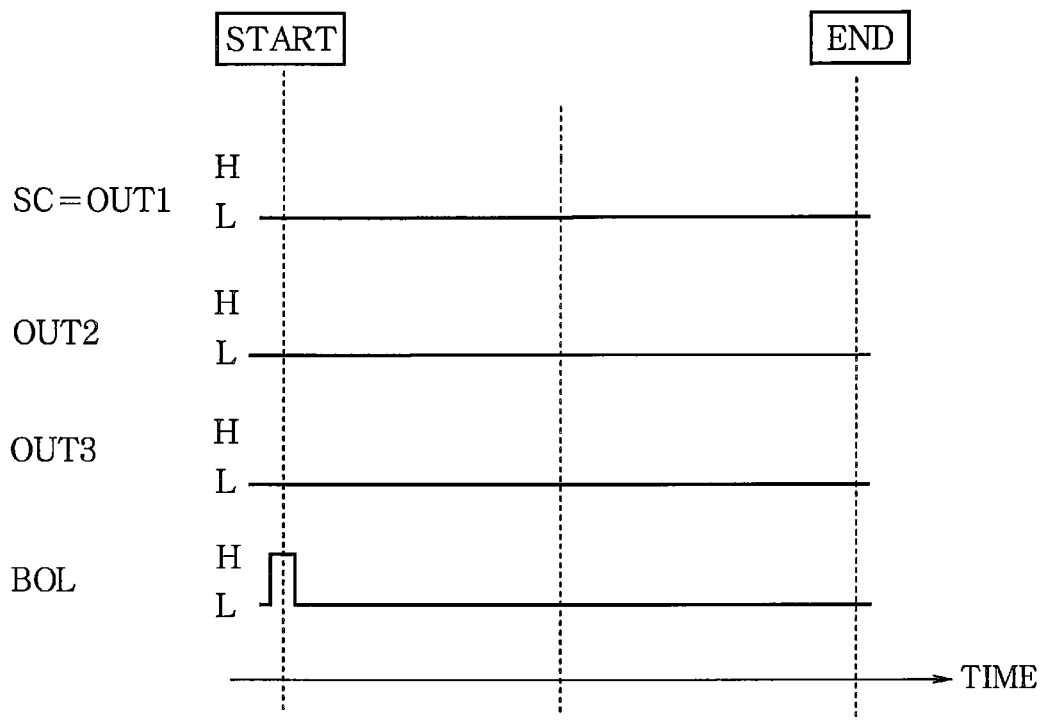
FIG. 31 illustrates signal changes during loading when the optical disc is a BD.
FIG. 32 is a table indicating the relationship between disc type and the levels of the OUT1 and OUT3 signals at the end of loading.

The signal changes when the optical disc is a BD are illustrated in FIG. 31. As in FIGS. 29 and 30, at the start of the operation of the loading mechanism, the control unit 110 drives signal BOL to the High level indicating the beginning of loading, and applies this signal to the reset input terminals R of the RS flip-flops 1303 and 1308. The result is that the outputs from the RS flip-flops 1303 and 1308 go Low. At the end of the operation of the loading mechanism, because the diffracted light from the BD never reaches the light detector 104, both signals OUT1 and OUT3 are Low.

A table of disc types and the states of signals OUT1 and OUT3 at the end of the operation of the loading mechanism is shown in FIG. 32. A decision circuit 1304 determines the disc type from the state of signals OUT1 and OUT3 at the end of the operation of the loading mechanism according to the table shown in FIG. 32. More specifically, when signal EOL is supplied from the control unit 110 at the end of the operation of the loading mechanism, if signal OUT1 is High and signal OUT3 is High, the decision circuit 1304 decides that the optical disc is a CD, if signal OUT1 is High and signal OUT3 is Low, the decision circuit 1304 decides that the optical disc is a DVD, if both signals OUT1 and OUT3 are Low, the decision circuit 1304 decides that the optical disc is a BD;

otherwise (if OUT1 is Low and OUT3 is High), the decision circuit 1304 decides that an error has occurred.

A signal indicating the decided result is output from the discriminator 114 as a type discrimination signal Stype.

In this way the optical disc transport device described above automatically discriminates whether the optical disc 101 is a CD, a DVD, or a BD during the loading of the disc, and signal Stype indicates the result.

In the circuit shown in FIG. 28 in this example, the reset signal BOL is supplied from the control unit 110 at the beginning of loading, and the decision circuit 1304 receives signal EOL from the control unit 110 at the end of loading. The present invention is not restricted to this example, however; it may be configured so that the control unit 110 supplies the discriminator 114 with a signal indicating the positional relationship between the optical disc and the light detector during loading and the discriminator 114 discriminates the type of optical disc from the signal indicating the positional relationship and the output signal SR from the light detector 104.

As described above, the optical disc discrimination method according to the present invention enables a single light detecting means to discriminate among a CD, for which there is second-order diffracted light, a DVD, and a BD. The type of optical disc inserted into an optical disc device compatible with a plurality of types of optical discs having different track pitches, such as a tabletop optical disc device or a car optical disc device, can thereby be discriminated by a simple structure.

REFERENCE CHARACTERS 101 optical disc, 102 light beam, 103 light emitting section, 104 light detector, 105 LED, 106 lens, 107 turntable, 108 diffracted light, 110 control unit, 111 loading mechanism, 114 discriminator, 115 light emission driver, 201 pit, 301 recording mark, 1301 resistor, 1302 comparator circuit, 1303 RS flip-flop, 1304 decision circuit, 1308 RS flip-flop, 1801 first-order diffracted light, 1802 second-order diffracted light, 1901 transparent layer, 2101 first-order diffracted light of DVD, 2102 spot, 2501 first-order diffracted light of CD, 2502 second-order diffracted light of CD, 2503 spot, 2504 spot.

What is claimed is:

1. An optical disc discrimination method for discriminating a type of optical disc loaded into an optical disc transport device having
a loading driver that moves the optical disc relative to a turntable in a direction of an axis of rotation of the turntable,
a light emitting section that directs a light beam onto the optical disc during loading, and
a light detecting unit disposed in a path of diffracted light from recording tracks on the optical disc when the light beam from the light emitting section is incident thereon,
said method comprising the step of discriminating the type of optical disc loaded from signal changes of detection output of the light detecting unit, due to a change in a positional relation between the optical disc and the light detecting unit during the period from a beginning of loading when the loading driver starts moving the optical disc relative to the turntable in the direction of the axis of rotation to an end of loading when the loading driver stops moving the optical disc relative to the turntable in the direction of the axis,
wherein while moving the optical disc relative to the turntable in the direction of the axis of rotation of the turntable, the loading driver keeps a recording surface of the optical disc perpendicular to the axis of rotation of the turntable.

2. The optical disc discrimination method of claim 1, wherein the optical disc transport device also has a control unit that outputs a signal indicating the beginning of loading and a signal indicating the end of loading, and the discriminating step discriminates the type of the optical disc loaded from the signal indicating the beginning of loading, the signal indicating the end of loading, and the detection output of the light detecting unit.

3. The optical disc discrimination method of claim 1, wherein the light emitting section and the light detecting unit are aligned in a straight line extending in a radial direction of the optical disc being loaded.

4. The optical disc discrimination method of claim 1, wherein the light detecting unit is disposed in a path of first-order diffracted light from the recording tracks on the optical disc when the optical disc is a DVD, the recording tracks have a 0.74-μm track pitch, and the optical disc is chucked in contact with the turntable.

5. The optical disc discrimination method of claim 1, wherein the light detecting unit is disposed in a position such that if the optical disc has a first track pitch and is chucked in contact with the turntable, the light detecting unit can detect first-order diffracted light from the recording tracks on the optical disc, and if the optical disc has a second track pitch greater than the first track pitch, the light detecting unit can detect first-order diffracted light from the recording tracks on the optical disc during the loading of the optical disc and second-order diffracted light from the recording tracks on the optical disc when the optical disc is chucked in contact with the turntable.

6. The optical disc discrimination method of claim 1, wherein the light emitting section is disposed so that the light beam is incident in a direction perpendicular to a recording surface of the optical disc.

7. The optical disc discrimination method of claim 1, wherein the light detecting unit comprises just one light detector, and the light detector has just one light receiving surface.

8. An optical disc transport device comprising:
    a loading driver that moves an optical disc relative to a turntable in a direction of an axis of rotation of the turntable,
    a light emitting section that directs a light beam onto the optical disc during loading,
    a light detecting unit disposed in a path of diffracted light from recording tracks on the optical disc when the light beam from the light emitting section is incident thereon, and
    a discriminator that discriminates a type of optical disc loaded from signal changes of detection output of the light detecting unit, due to a change in a positional relation between the optical disc and the light detecting unit during the period from a beginning of loading when the loading driver starts moving the optical disc in the direction of the axis of rotation to an end of loading when the loading driver stops moving the optical disc in the direction of the axis,
    wherein while moving the optical disc in the direction of the axis of rotation of the turntable, the loading driver keeps a recording surface of the optical disc perpendicular to the axis of rotation of the turntable.

9. The optical disc transport device of claim 8, further comprising a control unit that outputs a signal indicating the beginning of loading and a signal indicating the end of loading, wherein the discriminator discriminates the type of the optical disc loaded from the signal indicating the beginning of loading, the signal indicating the end of loading, and the detection output of the light detecting unit.

10. The optical disc transport device of claim 8, wherein the light emitting section and the light detecting unit are aligned in a straight line extending in a radial direction of the optical disc being loaded.

11. The optical disc transport device of claim 8, wherein the light detecting unit is disposed in a path of first-order diffracted light from the recording tracks on the optical disc when the optical disc is a DVD, the recording tracks have a 0.74-μm track pitch, and the optical disc is chucked in contact with the turntable.

12. The optical disc transport device of claim 8, wherein the light detecting unit is disposed in a position such that:
    if the optical disc has a first track pitch and is chucked in contact with the turntable, the light detecting unit can detect first-order diffracted light from the recording tracks on the optical disc; and
    if the optical disc has a second track pitch greater than the first track pitch, the light detecting unit can detect first-order diffracted light from the recording tracks on the optical disc during the loading of the optical disc and second-order diffracted light from the recording tracks on the optical disc when the optical disc is chucked in contact with the turntable.

13. The optical disc transport device of claim 8, wherein the light emitting section is disposed so that the light beam is incident in a direction perpendicular to a recording surface of the optical disc.

14. The optical disc transport device of claim 8, wherein the light detecting unit comprises just one light detector, and the light detector has just one light receiving surface.

15. An optical disc device including the optical disc transport device of claim 8.

16. An optical disc inspection device including the optical disc transport device of claim 8.

17. An optical pickup inspection device including the optical disc transport device of claim 8.

18. The optical disc transport device of claim 9, wherein the discriminator includes
    a flip-flop that is reset by said signal indicating the beginning of loading, and set when the detection output indicates that the diffracted light is incident on the light detecting unit, and
    a decision circuit that determines the type of the optical disc based on the output of the flip-flop and the detection output when the signal indicating the end of loading is output.

19. The optical disc transport device of claim 18, wherein said decision circuit determines
    that the optical disc is a CD, if the detection output indicates that the diffracted light is not incident on the light detecting unit and the output of the flip-flop indicates that the flip-flop is in a set state, at the time when the signal indicating the end of loading is output;
    that the optical disc is a DVD, if the detection output indicates that the diffracted light is incident on the light detecting unit and the output of the flip-flop indicates that the flip-flop is in a set state, at the time when the signal indicating the end of loading is output; and
    that the optical disc is a BD, if the detection output indicates that the diffracted light is not incident on the light detecting unit and the output of the flip-flop indicates that the flip-flop is in a reset state, at the time when the signal indicating the end of loading is output.

20. The optical disc transport device of claim 9, wherein the discriminator includes
    a first flip-flop that is reset by said signal indicating the beginning of loading, and set when the detection output indicates that the diffracted light is incident on the light detecting unit,
    a second flip-flop that is reset by said signal indicating the beginning of loading, and set when the detection output indicates that the diffracted light is not incident on the light detecting unit and the first flip-flop is in a set state, and
    a decision circuit that determines the type of the optical disc based on the output of the second flip-flop and the detection output when the signal indicating the end of loading is output.

21. The optical disc transport device of claim 20, wherein said decision circuit determines
    that the optical disc is a CD, if the detection output indicates that the diffracted light is incident on the light detecting unit and the output of the second flip-flop indicates that the second flip-flop is in a set state, at the time when the signal indicating the end of loading is output;

that the optical disc is a DVD, if the detection output indicates that the diffracted light is incident on the light detecting unit and the output of the second flip-flop indicates that the second flip-flop is in a reset state, at the time when the signal indicating the end of loading is output; and that the optical disc is a BD, if the detection output indicates that the diffracted light is not incident on the light detecting unit and the output of the second flip-flop indicates that the second flip-flop is in a reset state, at the time when the signal indicating the end of loading is output.

22. The optical disc discrimination method of claim 1, wherein the decision on the type of the optical disc is made based on a signal indicating whether the detection output of the light detecting unit indicating incidence of the diffracted light on the light detecting unit is produced at any instance within the period from the start of the loading to the end of the loading, and the detection output of the light detecting unit at the end of the loading.

* * * * *